US000001518H

United States Statutory Invention Registration [19]

[11] Reg. Number: H1518

[45] Published: Feb. 6, 1996

Djiauw et al.

[54] IMPACT MODIFICATION OF POLYPROPYLENE WITH STYRENE/ISOPRENE TRIBLOCK COPOLYMERS

[75] Inventors: Lie K. Djiauw; Michael J. Modic, both of Houston; Richard Gelles, Sugar Land; Glenn R. Himes, Houston, all of Tex.

[73] Assignee: Shell Oil Company, Houston, Tex.

[21] Appl. No.: 304,974

[22] Filed: Sep. 13, 1994

Related U.S. Application Data

[63] Continuation of Ser. No. 150,654, Nov. 3, 1993, abandoned.

[51] Int. Cl.[6] ..... C08L 7/00

[52] U.S. Cl. ..... 525/98

[58] Field of Search ..... 525/98

[56] References Cited

U.S. PATENT DOCUMENTS

| | | | |
|---|---|---|---|
| 5,026,752 | 6/1991 | Wakabayashi | 524/271 |
| 5,045,589 | 9/1991 | Ueno | 525/88 |
| 5,060,818 | 10/1991 | Doi | 220/454 |
| 5,086,109 | 2/1992 | Ueno | 524/496 |
| 5,256,734 | 10/1993 | Sugihara | 525/98 |
| 5,374,677 | 12/1994 | Nishio | 524/451 |

FOREIGN PATENT DOCUMENTS

| | | |
|---|---|---|
| 0308001 | 3/1989 | European Pat. Off. . |
| 0029842 | 2/1983 | Japan . |
| 9149939 | 8/1984 | Japan . |
| 5070699 | 3/1993 | Japan . |
| 5163394 | 6/1993 | Japan . |

*Primary Examiner*—Donald P. Walsh
*Assistant Examiner*—Anthony R. Chi

[57] ABSTRACT

Compositions consisting essentially of from 60% to 95% by weight of the polymer components of a high flow polypropylene and from 40% to 5% by weight of a polystyrene-hydrogenated polyisoprene-polystyrene block copolymer have excellent low temperature impact strength and high heat distortion temperature for molding large automobile parts.

4 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

IMPACT MODIFICATION OF POLYPROPYLENE WITH STYRENE/ISOPRENE TRIBLOCK COPOLYMERS

This is a continuation of application Ser. No. 08/150,654, filed Nov. 3, 1993, now abandoned.

FIELD OF THE INVENTION

The invention relates to compositions that contain polyolefin resins and elastomeric block copolymers. More specifically, the invention relates to polypropylene molding compositions that have improved impact resistance.

BACKGROUND OF THE INVENTION

Polypropylene molding compositions containing low or medium flow polypropylene have good impact resistance when the composition includes a high molecular weight styrenic block copolymer having the structure polystyrene-hydrogenated polybutadiene-polystyrene, e.g. KRATON® G1650 thermoplastic elastomer. The impact strengths are suitable for use of the molding compositions in large automotive parts. However, research has established that polypropylene molding compositions for large automotive parts must also have improvements in rigidity, heat deformation resistance, low temperature impact resistance, and surface appearance.

High flow polypropylene molding compositions that are suitable for large automotive parts except for inferior low temperature impact strength and inferior high temperature heat deformation are produced by blending low molecular weight polystyrene with low molecular weight diblock copolymers of polystyrene-hydrogenated butadiene. A blend of the triblock and diblock copolymers is commercially available as KRATON® G1657 elastomer which is available from Shell.

U.S. Pat. No. 5,045,589 describes much improved polypropylene molding compositions comprising a crystalline ethylene/propylene block copolymer, an amorphous polypropylene copolymer, and a thermoplastic elastomer which can be a polystyrene-hydrogenated polybutadiene-polystyrene elastomer, e.g. KRATON® G1650 elastomer, or a polystyrene-hydrogenated polyisoprene-polystyrene elastomer.

SUMMARY OF THE INVENTION

The present invention provides a high flow polypropylene molding composition that is excellent for large automobile parts, the polypropylene composition containing a low molecular weight polystyrene-hydrogenated polyisoprene-polystyrene elastomer which is superior to butadiene based elastomers for improving low temperature impact strength and high temperature heat distortion. The isoprene based triblock polymers are also excellent modifiers for blends containing ethylene/propylene block polymers.

DETAILED DESCRIPTION OF THE INVENTION

Polypropylene molding compositions comprising 60–95%, preferably 80–95%, by weight of the polymer components of a high flow polypropylene homopolymer or copolymer and 40–5%, preferably 20–5%, by weight of the polymer components of a low molecular weight polystyrene-hydrogenated polyisoprene-polystyrene block copolymer have excellent physical and appearance properties including superior low temperature impact strength and superior high temperature heat deformation. The peak molecular weight of the block copolymers ranges from 58,000 to 82,000 with a polystyrene content from 13% to 20%.

The high flow propylene polymer can be (i) a homopolymer of propylene, (ii) a random copolymer of propylene and an olefin selected from ethylene and $C_4$–$C_{10}$ alpha-olefins, or (iii) a random terpolymer of propylene with two alpha-olefins selected from the group consisting of ethylene and $C_4$–$C_{10}$ alpha olefin, provided that the propylene polymer has a melt flow higher than 30 dg/min as measured by ASTM Method D 1238-82 (230° C./5 kg). Preferably, the polypropylene has a melt flow from 50 to 80 dg/min. The $C_4$–$C_{10}$ alpha-olefins include linear and branched $C_4$–$C_{10}$ alpha-olefins such as 1-butene, 1-pentene, 4-methyl-pentene-1, 3-methyl-1-butene, 1-hexene, 3-4-dimethyl-1-butene, 1-heptene, 3-methyl-1-hexene, 1-octene and the like.

The elastomeric block copolymers employed in the molding compositions of the present invention have two polystyrene endblocks and one hydrogenated isoprene midblock in a linear arrangement (S-EP-S). The polystyrene endblocks each preferably have a peak molecular weight from 4,500 to 8,000, most preferably from 5,000 to 5,500, which results in formation of weak polystyrene domains and low melt viscosity.

The hydrogenated isoprene blocks have a residual unsaturation less that 5%, preferably less than 2%, and may have from 30% to 100% 1,4-addition of the isoprene. The block copolymers are readily prepared by anionic polymerization and selective hydrogenation processes known in the art to give polymers having low polydispersity.

The polypropylene molding compositions could further contain polyethylene-polypropylene block copolymers as described in U.S. Pat. No. 5,045,589 which is incorporated by reference herein.

Fillers and reinforcing agents, e.g. carbon black and glass fibers, as well as inorganic powders such as calcium carbonate, talc, mica, and glass, may be included in the composition of the invention at concentration levels up to about 80 parts by weight per 100 parts by weight of the total polymer components. In addition to the economic benefit such fillers afford, greater stiffness and a higher heat distortion temperature can be attained.

The components of the composition can be blended or admixed in any conventional mixing apparatus, such as an extruder or a Banbury mixer.

EXAMPLES

The following examples, presented for illustrative purposes, describe various embodiments of the polypropylene molding composition of the invention.

In all of the examples and control experiments, the polypropylene and the S-EP-S block copolymer, as well as any other modifier used in comparison, were mixed and extruded in a single pass through a co-rotating twin-screw extruder. A stabilizer composition (0.08 weight%), known as Irganox 1010, was added to all batches before compounding to minimize oxidation. The extruder temperature was in the 200°–245° C. range. The extruded blends were molded into test specimens.

The test methods used to evaluate the molded specimens were ASTM D-256 (notched Izod impact at room temperature), ASTM D-638 (tensile strength), ASTM D-790 (flexural modulus), and ASTM-648 (Heat Distortion Temperature at 1820 kPa).

EXAMPLES 1–2

Two polypropylene molding compositions of the invention were made and tested as described above. In these compositions the block copolymer was a S-EP-S block copolymer. Two control compositions containing known styrene/butadiene block copolymers also were made and tested in the same manner.

The propylene polymer used in the preparation of the molding compositions was a pelletized polypropylene resin, commercially available from UBE (UBE ZT772), a nominal melt flow rate (ASTM Method D 1238-82, 230° C./5 kg) of 66 dg/min.

The block copolymers are further described in Table I and the polypropylene molding compositions and results of the evaluations performed on the Example 1–2 compositions and the two control compositions are shown in Table II.

TABLE I

| | Comparison Example No. | | Example No. | |
|---|---|---|---|---|
| | A[a] | B[b] | 1 | 2 |
| Triblock/Diblock in Block Copolymer (wt %) | 100% S-EB-S | 70% S-EB-S<br>30% S-EB | 100% S-EP-S | 100% S-EP-S |
| Molecular Weight (peak) | 71,000 | 82,000<br>41,000 | 62,000 | 59,000 |
| Triblock/Diblock | | | | |
| Polystyrene (wt %)[c] | 30 | 13 | 18 | 19 |
| Melt Flow dg/min[d] | No Flow | 20–29 | 14 | 29 |
| Tensile strength psi | 3,100 | 2,550 | 3,100 | 3,125 |

[a]Commercially available-KRATON ® G1650 elastomer from Shell.
[b]Commercially available-KRATON ® G1657 elastomer from Shell.
[c]Measured prior to hydrogenation.
[d]ASTM D-1238 (230° C./5 kg).

TABLE II

| | Comparison Example No. | | Example No. | |
|---|---|---|---|---|
| Polypropylene Comp.[a] | A | B | 1 | 2 |
| Heat Distortion Temperature (°C.) | 109.0 | 104.1 | 105.6 | — |
| Brittleness Temp. (°C.) | −37.6 | −40.8 | −45.0 | — |
| Izod Impact (Kg-cm/cm$^2$) | 15.8 | 21 | 38 | 57 |
| Melt Flow dg/min[b] | 40 | 59 | 57 | 60 |
| Flex Modulus (Kg/cm$^2$) | 12,450 | 12,070 | 12,040 | 11,410 |

[a]Contains 90% high flow polypropylene and 10% block copolymer with 0.08% Irganox 1010.
[b]ASTM 1238 230° C./5 kg.

What is claimed is:

1. A polypropylene molding composition, comprising:

from 60% to 95% by weight of the polymer components of a high flow polypropylene having a melt flow from 50 to 80 dg/min, wherein the polypropylene is selected from a group consisting of homopolymers of propylene, random copolymers of propylene and an olefin selected from ethylene and $C_4$–$C_{10}$ alpha-olefins, and random terpolymers of propylene with two alpha-olefins selected from ethylene and $C_4$–$C_{10}$ alpha-olefins; and from 40% to 5% by weight of the polymer components of a polystyrene-hydrogenated polyisoprene-polystyrene block copolymer having a peak molecular weight from 4,500 to 8,000 for each polystyrene block and a polystyrene content from 13% to 20%.

2. The composition of claim 1, wherein each polystyrene block in the block copolymer has a peak molecular weight from 5,000 to 5,500.

3. The composition of claim 1, wherein the high flow polypropylene comprises from 80% to 95% of the polymer components.

4. The composition of claim 1, further comprising up to about 80 parts of a filler per 100 parts of the total polymer components.

* * * * *